July 19, 1966   E. H. ZDVORAK   3,261,221

MOTION COMPENSATING DEVICE

Filed March 23, 1964   3 Sheets-Sheet 1

INVENTOR.
EDWARD H. ZDVORAK
BY Lyon & Lyon
ATTORNEYS

INVENTOR.
EDWARD H. ZDVORAK
BY
Lyon & Lyon
ATTORNEYS

INVENTOR.
EDWARD H. ZDVORAK
BY Lyon Lyon
ATTORNEYS

United States Patent Office 3,261,221
Patented July 19, 1966

3,261,221
MOTION COMPENSATING DEVICE
Edward H. Zdvorak, San Diego, Calif., assignor to Fluidgenics, National City, Calif., a corporation of California
Filed Mar. 23, 1964, Ser. No. 353,941
12 Claims. (Cl. 74—230.17)

The present invention relates to means and techniques useful in motion compensating devices and, as described herein, is particularly useful as a compensator in flow metering systems.

Briefly as described herein, the compensator has an input shaft and an output shaft with the input shaft being adapted to be connected to the output shaft of a flow meter and with the output shaft of the compensator being adapted to drive a meter counter which registers in terms of fluid volume as, for example, gallons. The compensator incorporates means for compensating for temperature generally within a range from minus 30 degrees Fahrenheit to plus 150 degrees Fahrenheit with fluids of API gravity extending through groups O to V. Means are also provided to provide a correction for errors otherwise introduced due to operational conditions and for effecting a calibration.

It is therefore a general object of the present invention to provide an improved device of this character having an input and an output shaft with means incorporated therein for adjusting the relative speeds of the input and output shafts, i.e. the speed ratio of these shafts in accordance with different conditions.

A specific object of the present invention is to provide a motion compensator for connection between a flow meter and a meter counter.

Another specific object of the present invention is to provide a speed compensator of this character which adjusts itself automatically to operational conditions and particularly temperature changes.

Another specific object of the present invention is to provide a motion compensator of this character incorporating means that provide adjustments for different conditions, such as for example temperature, specific gravity and calibration in general.

Another specific object of the present invention is to provide a device of this character which is simple, compact and rugged for use in connection with flow meters.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
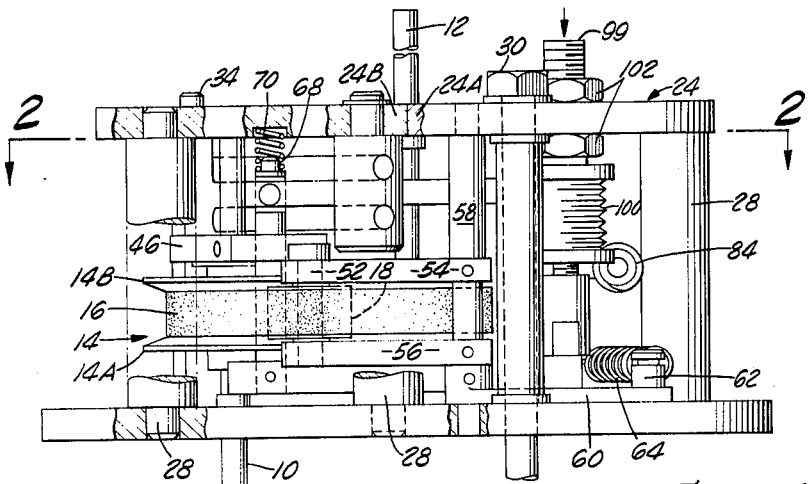
FIGURE 1 illustrates an embodiment of the present invention with the view thereof being taken generally as indicated by the lines 1—1 in FIGURE 2.

The motion compensating device involves generally an input safth 10 and an output shaft 12, the shaft 10 driving an adjustable sheave 14. A V-belt 16 extends around sheave 14, idler roller 18 and a second adjustable sheave 20 for driving the output shaft 12 and the device connected thereto such as, for example, a revolution or meter counter (not shown). The input shaft 10 is adapted for connection to a flow meter. Changes in relative speed between the input and output shafts are accomplished by the two sheaves 14 and 20 each of which, for this purpose, is a radially split sheave having the sections or halves 14A, 14B and 20A, 20B, respectively.

Essentially all elements of the device are mounted between a top plate 24 and a bottom plate 26 having three holes 26A therein for mounting a cover (not shown). The top plate 24 actually comprises two sections 24A, 24B to allow ease of assembly of such elements and these two sections meet at an irregular parting line indicated geeraly at 24C in FIGS. 2 and 7.

The two plates 24, 26 are maintained in spaced relationship by four spacer rods 28 each having reduced end portions to provide shoulders engaging corresponding plates. The pair of bolts 30 (FIGS. 5 and 7) extending through only the top section 24A and bottom plate 26 and intermediate spacer sleeves 32 are used to secure the compensator with respect to, for example, a flow meter; and the other top plate section 24B may be releasably secured with respect to the bottom plate using bolts 34 (FIG. 3) which serve to clamp the top plate section 24B to an arcuate calibrator plate 36 having its bottom end secured to the bottom plate 26 by dowel pin 38 (FIG. 4).

The input shaft 10 (FIG. 3) is rotatably supported in bearings 40, 42 recessed in plate 26 and plate section 24B, respectively, and is connected by pin 44 to the pulley half 14A, the other pulley half 14B being in engagement with an arm 46 through a suitable bearing 48 that allows the two pulley halves 14A, 14B to rotate together with respect to the end of arm 46 which is adjusted to adjust the effective diameter of pulley 14 in a manner described later.

The output shaft 12 is rotatably supported in bottom plate 26 and top plate section 24B in like manner as shaft 11 and has connected thereto the pulley half 20B, the other pulley half 20A being rotatably supported on one end of an arm 50 which is adjusted to adjust the effective diameter of pulley 20 in a manner described later.

The idler roller 18 is spring urged to provide a substantial constant tension in the belt 16 which travels over the pulleys 14, 20 and idler roller 18, and for that purpose the idler roller 18 is rotatably supported on a shaft 52 extending between adjacent ends of arms 54 and 56, the other ends of such arms 54, 56 being pin connected to a pivotal shaft 58 having its ends rotatably supported in the top plate section 24A and bottom plate 26; and also connected to such pivotal shaft 58 is one end of an arm 60 having a stud 62 mounted on its other end to provide a fastening for one end of the coil tension-spring 64 having its other end secured to a post 66 on the bottom plate 26.

Figure 3:
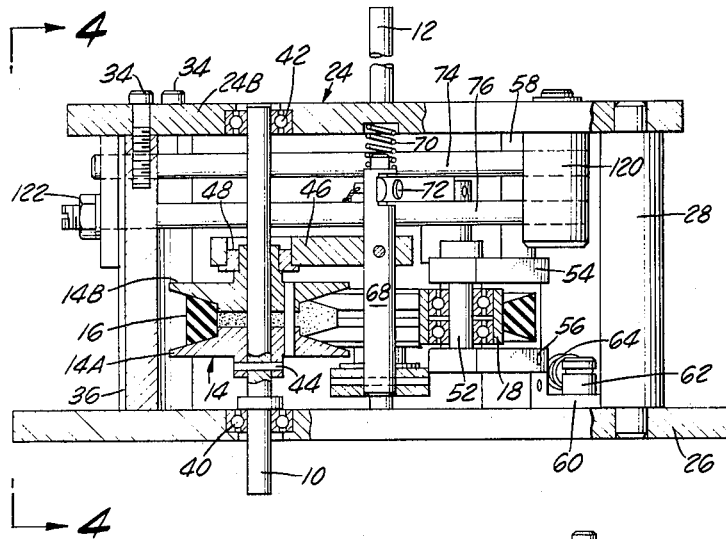
FIGURE 3 is a view taken generally as indicated by the line 3—3 of FIGURE 2.
Figure 4:
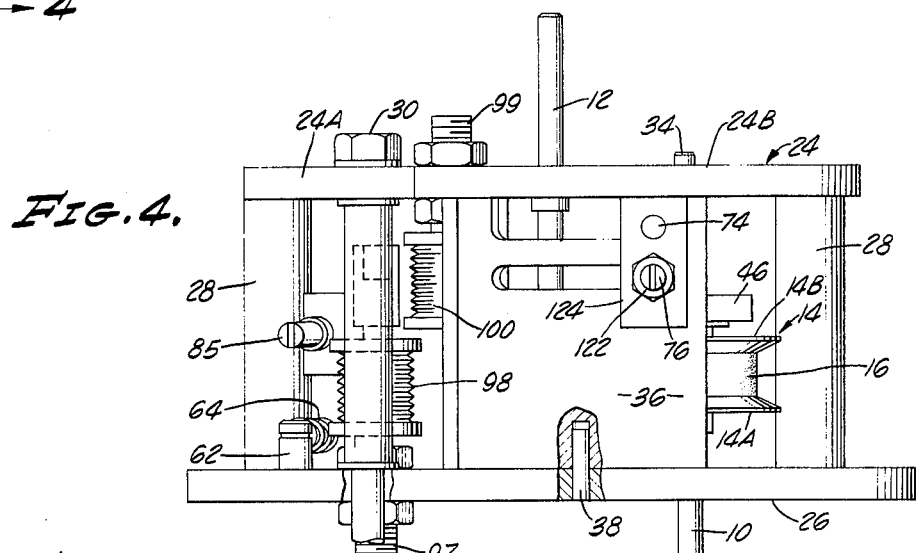
FIGURE 4 is a view taken generally as indicated by the lines 4—4 in FIGURE 3.
Figure 6:
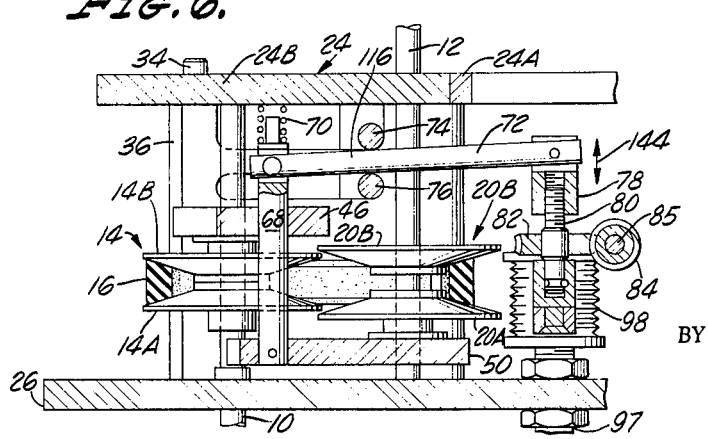
FIGURE 6 is a view taken generally as indicated by the lines 6—6 in FIGURE 2.

For changing the effective diameters of the pulleys 14 and 20 jointly, the previously mentioned arms 46 and 50 are each pin connected to a common vertically extending rod 68 having its upper end shouldered, as seen in FIGS. 1, 3 and 6, to provide a seat for a coil compression spring 70 that acts between the top plate section 24B and such rod 68. The upper end of the rod 68 is pin connected to one end of an arm 72 which extends between a pair of rods 74 and 76 and which is pin connected at its other end to a member 78 (FIG. 6) which screw-threadedly receives the shaft 80 of a gear 82, the gear 82 being engaged by a worm gear 84 having a shaft 85 which is rotatably supported in a block 86. The block 86 is secured to a bent strap member or bar 88 (FIG. 5) having opposite ends thereof pin connected respectively to members 90 and 92, respectively, which screw-threadedly receive a corresponding threaded rod 94 and 96 on the movable ends of bellows members 98 and 100. The stationary tubular ends 97, 99 of such bellows 98 and 100 are secured by jamb nuts 102, 104 to the bottom plate member 26 and the top plate section 24A, respectively. Also, such bent strap member or bar 88 is secured by, for example, a rivet 104 (FIG. 5) to a socket member 106 for one end of the shaft 80 of gear 82, such shaft 80 being rotatably secured in such socket member 106 by, for example, a circular spring 108 cooperating between a grooved portion of the shaft 80 and the grooved portion in the socket member 106.

Figure 2:
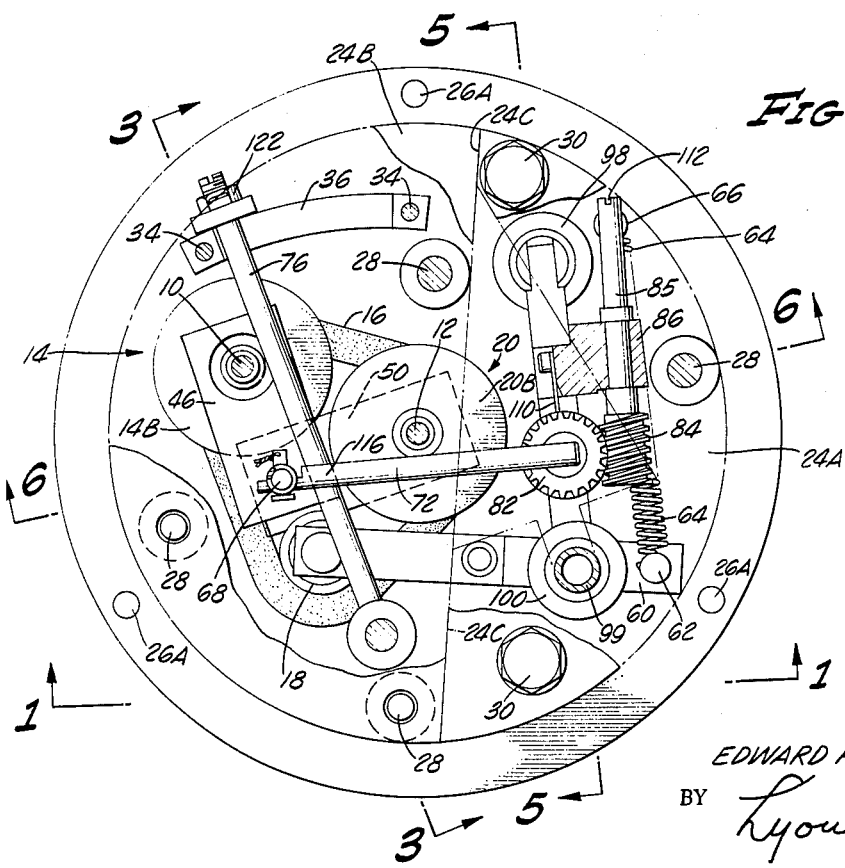
FIGURE 2 is a view taken generally as indicated by the line 2—2 in FIGURE 1.

A cantilever supported leaf spring 110, as shown in FIGURE 2, may have one of its ends secured to the block 86 and the other one of its ends engageable with a toothed portion of the gear 82.

In accordance with the structure described above, manual rotation of the worm gear 84 as, for example, by applying a screwdriver to the kerf 112 in the shaft 85 produces rotation of the gears 84 and 82 to raise or lower the end of the rod 72, as indicated by the arrows 114 in FIGURE 6, with the rod 72 pivoting at its fulcrum which is a point intermediate the two parallel spaced rods 74 and 76 to cause joint upward or downward movement of the pulley actuating arms 46 and 50 depending upon the direction in which the shaft is manually rotated. It will be seen that for one direction of rotation of the manually operable shaft 85, the pulley half 14B is moved closer to the pulley half 14A and simultaneously the pulley half 20A is moved away from the pulley half 20B to effect an increase in speed ratio between the input and output shafts 10 and 12; and when the manually operable shaft 85 is rotated in the opposite direction, the arms 46 and 50 effect a speed change in the opposite direction, i.e. the speed of shaft 12 is decreased with respect to the rotational speed of the input shaft 10.

Figure 5:
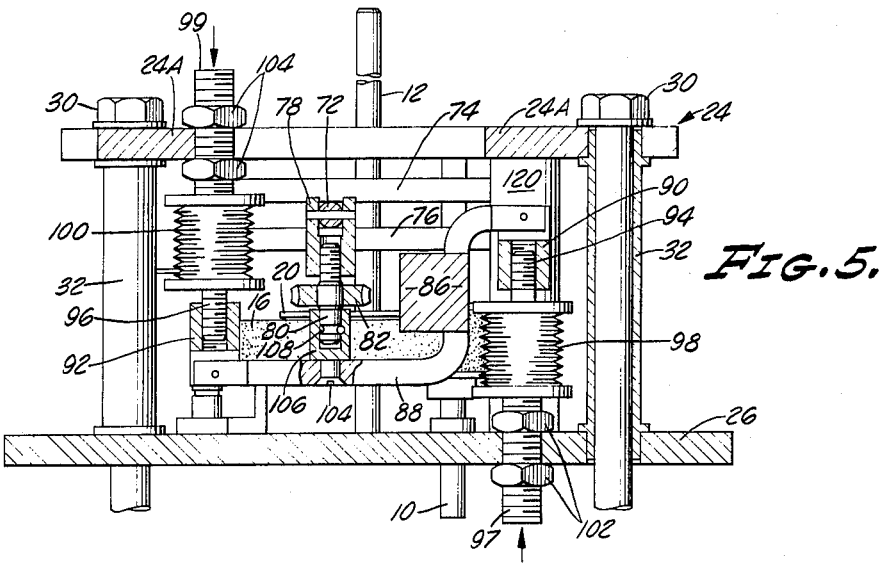
FIGURE 5 is a view taken generally as indicated by the lines 5—5 in FIGURE 2.

It will also be seen that the position of the pulley actuating members 46 and 50 is effected by pressure conditions in the bellows 98 and 100. When the pressure in bellows 98 increases (the pressure in the other bellows 100 remaining constant), the lever 72 is pivoted counterclockwise in FIG. 6 to produce an increase in speed in shaft 12 (assuming constant input speed of input shaft 10); and, likewise, when there is an increase in pressure in the other bellows 100 (the pressure in bellows 98 being assumed to remain unchanged), the lever 76 is pivoted clockwise in FIG. 6 to produce a reduction in speed in output shaft 12 (assuming constant rotational speed of input shaft 10); also, when the pressure in bellows 98 and 100 increases in the same direction and in the same amount, there is no change in output speed (assuming constant input speed) since the forces produced at the end of lever 72 shown in FIG. 5 are balanced, and thus there is no movement of the pulley actuating elements 46 and 50.

It will be observed also, as described above, that speed changes are effected by pivoting the rod 72 about a fulcrum which is effectively a point 116 (FIG. 6) intermediate the two parallel spaced rods 74, 76. While a fixed fulcrum point 116 may be provided in some instances it is preferred that the fulcrum point 116 may be adjusted using the means now described for achieving additional compensation. These rods 74, 76 each have one of their ends secured to a cylindrical member 120 (FIG. 3) which is pivotally mounted on the top plate section 24B, the other ends of the rods 74, 76 extending through elongated slotted portions in the arcuate plate 36 (FIG. 4), with the lower rod 76 being screw-threaded to receive a clamping nut 122 for engagement with a clamping plate 124 which serves when the nut 122 is tightened to secure the two arms 74, 76 movable as a unit in an adjusted position, i.e. in a position that establishes the particular point 116 about which the pulley actuating arm 72 is pivoted. This adjustment of the position of rods 74 and 76 is for purposes for providing an adjustment for specific gravity of the particular fluid whose flow is being determined.

The manually adjustable shaft 85 is generally for purposes of calibration; and the bellows 98, 100 are provided to automatically provide a compensation for changes in the ambient temperature as well as temperature of the fluid whose flow is being measured. For this latter purpose, the bellows 100 and an interconnected temperature sensing element (not shown) may, for example, be filled with an expansible fluid which expands in accordance with increases in temperature with such sensing element being responsive to ambient temperatures such that when the ambient temperature increases the bellows 100 is expanded more to exert a greater force on the bellows interconnecting strap member 88. Likewise, the other bellows 98 may be connected to a like different temperature sensing element immersed in the fluid being metered so that the pressure developed in bellows 98 changes in accordance with such temperature and such, for example, that an increase in temperature of the fluid causes expansion of the bellows 98 and exerts a greater force on such member 88. When the ambient temperature changes, both bellows are affected equally, with the result that there is reduced motion as shown by 114 in FIG. 6, and therefore little change in the output shaft speed, and thus, there is no change in relative speeds between the input and output shafts 10 and 12.

Figure 7:
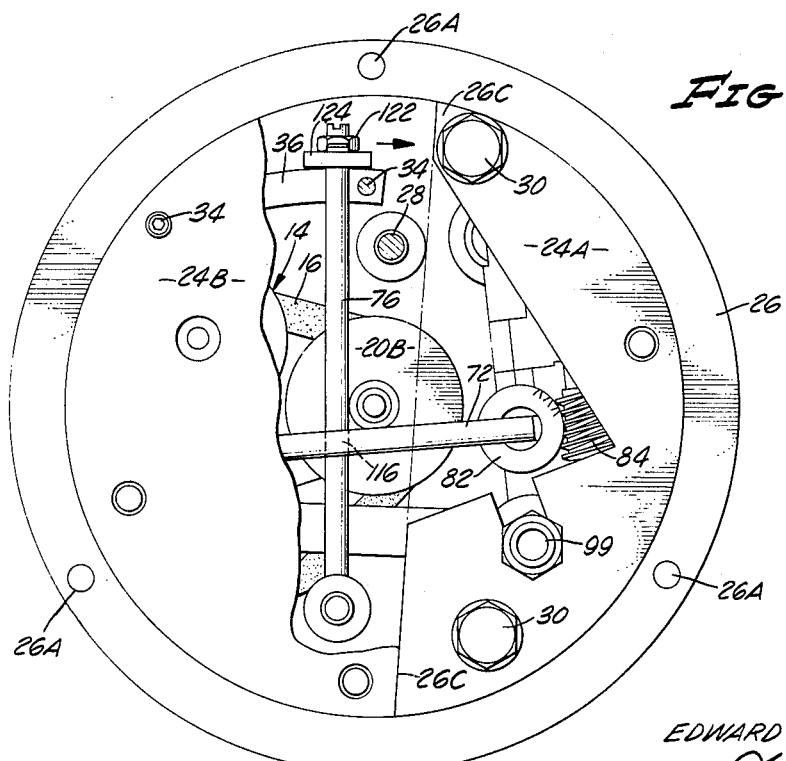
FIGURE 7 is a view like FIGURE 2 showing a different adjusted condition.

The sensitivity of the device to temperature changes may be changed by adjustment of the fulcrum point 116 of lever 72, such adjustment being accomplished by joint adjustment of levers 74, 76 from, for example, their position shown in FIG. 2 to a different adjusted position in FIG. 7. In the former condition illustrated in FIG. 2, the pivot point 116 is nearer to pulley actuating arm or rod 68 than is the case in FIG. 7, and thus, a particular temperature differential as effectively measured by the joint action of bellows 98, 100 produces a smaller change in speed ratio than is the case when the pivot point 116 is further from the rod 68 as illustrated in FIG. 7. Thus, compensation is provided for changes in specific gravity of the fluid being metered, and the device may be adjusted so that regardless of temperature changes of such fluid the counter coupled to output shaft 12 registers in gallons, the volume at 60 degrees Fahrenheit.

Preferably the split pulley halves are interconnected by a pin 14P as illustrated in FIG. 3, with such pin being pressfitted into one of the pulley halves and extending into a slightly oversize hole in the other pulley half to assure rotation as a unit.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, a supporting structure, an input shaft rotatably supported on said structure, an output shaft rotatably supported on said structure, a split two-part sheave having one of its parts connected to one of said shafts, a sheave connected to the other of said shafts, an actuating element connected to the other part of said two-part sheave to change the effective diameter of said two-part sheave, a belt passing over said sheaves, spring operated means on said structure for tensioning said belt, a lever having one of its ends attached to said element, means on said structure for fulcruming said lever at a point intermediate the ends of said lever, and condition responsive means on said structure for applying a force to the other end of said lever to vary the relative positions of said one and other sheave parts to vary the speed ratio between said shafts, and means for adjusting said fulcruming means to adjust said fulcruming point.

2. In apparatus of the character described, a supporting structure, an input shaft rotatably supported on said structure, an output shaft rotatably supported on said structure, a split two-part sheave having one of its parts connected to one of said shafts, a sheave connected to the other of said shafts, an actuating element connected to the other part of said two-part sheave to change the effective diameter of said two-part sheave, a belt passing over said sheaves, spring operated means on said structure for tensioning said belt, a lever having one of its ends attached to said element, means on said structure for fulcruming said lever at a point intermediate the ends of said lever, and condition responsive means on said structure for applying a force to the other end of said lever to vary the relative positions of said one and other sheave parts to vary the speed ratio between said shafts, said sheave connected to the other of said two shafts being also a split two-part sheave with one part thereof connected to said other shaft and with the other part thereof connected to said actuating element such that movement of said actuating element causes the effective diameters of such sheave to change in opposite sense.

3. In apparatus of the character described, a supporting structure, an input shaft rotatably supported on said structure, an output shaft rotatably supported on said structure, a split two-part sheave having one of its parts connected to one of said shafts, a sheave connected to the other of said shafts, an actuating element connected to the other part of said two-part sheave to change the effective diameter of said two-part sheave, a belt passing over said sheaves, a spring operated means on said structure for tensioning said belt, a lever having one of its ends attached to said element, means on said structure for fulcruming said lever at a point intermediate the ends of said lever, and condition responsive means on said structure for applying a force to the other end of said lever to vary the relative positions of said one and other sheave parts to vary the speed ratio between said shafts, said condition responsive means including an expansible member having a movable portion thereof connected to said other end of said lever.

4. In apparatus of the character described, a supporting structure, an input shaft rotatably supported on said structure, an output shaft rotatably supported on said structure, a split two-part sheave having one of its parts connected to one of said shafts, a sheave connected to the other of said shafts, an actuating element connected to the other part of said two-part sheave to change the effective diameter of said two-part sheave, a belt passing over said sheaves, spring operated means on said structure for tensioning said belt, a lever having one of its ends attached to said element, means on said structure for fulcruming said lever at a point intermediate the ends of said lever, and condition responsive means on said structure for applying a force to the other end of said lever to vary the relative positions of said one and other sheave parts to vary the speed ratio between said shafts, said condition responsive means including two expansible members each having a movable portion thereof connected to a common operating member having an intermediate portion thereof connected to the other end of said lever.

5. Apparatus as set forth in claim 4 in which said intermediate portion of said member is connected to said other end of said lever through an adjustable length connecting structure.

6. Apparatus as set forth in claim 5 in which said adjustable length connecting structure includes a rotatable element rotatably supported on said operating member and carrying a worm gear and a screw-threaded portion, said other end of said lever being pivotally mounted on an element having a screw-threaded portion cooperating with the first mentioned screw-threaded portion, and an adjustable worm mounted on said operating member and cooperating with said worm gear to adjust the spacing between said operating member and said other end of said lever.

7. Apparatus as set forth in claim 6 in which said rotatable element is rotatably supported on said operating member at a point midway between the movable portions of said expansible members.

8. Apparatus as set forth in claim 7 in which said operating member is connected to said expansible members and said other end of said lever such that equal expansions of said expansible members produce no movement of said other end of said lever.

9. In a speed ratio altering device of the character described for compensating for changes in characteristics of fluids being metered, the combination comprising an input shaft, an output shaft, speed ratio altering means connected between said shafts, a lever operating said altering means and being connected to said altering means for operating the same, adjustable fulcrum means for fulcruming said lever at an adjustable fulcrum point thereof, balanced condition responsive means, an adjustable length connection between said lever and said balanced condition responsive means with an unbalance in said condition responsive means producing movement of said lever through said adjustable length connection and about said adjustable fulcrum point.

10. In a speed ratio altering device of the character described, an input shaft, an output shaft, variable speed change means connected between said shafts for changing the speed ratio between said shafts, balanced condition responsive means, interconnecting means connected between said responsive means and said speed change means and effective to operate said speed change means only upon occurrence of an unbalanced condition in said balanced condition responsive means, and means for adjusting the degree to which said speed changing means and said speed ratio is changed by said interconnecting means upon said occurrence, and additional means incorporated in said interconnecting means for altering said speed change means independently of conditions in said condition responsive means.

11. In a speed ratio altering device of the character described, an input shaft, an output shaft, variable speed change means connected between said shafts for changing the speed ratio between said shafts, balanced condition responsive means, interconnecting means connected between said responsive means and said speed change means and effective to operate said speed change means only upon occurrence of an unbalanced condition in said balanced condition responsive means, and means for adjusting the degree to which said speed changing means and said speed ratio is changed by said interconnecting means upon said occurrence, said adjusting means including adjustable fulcrum means for a lever forming a part of said interconnecting means.

12. A device as set forth in claim 11 in which said additional means includes an extensible connection in said interconnecting means.

References Cited by the Examiner
UNITED STATES PATENTS

| | | | |
|---|---|---|---|
| 2,369,681 | 2/1945 | Miles | 74—230.17 X |
| 2,549,038 | 4/1951 | Zenner | 74—242.11 |
| 2,647,965 | 8/1953 | Michie | 74—230.17 X |
| 2,844,963 | 7/1958 | Stewart | 74—230.17 X |
| 2,983,157 | 5/1961 | Pokorny | 74—230.17 |
| 3,034,368 | 5/1962 | Wingbermuehle et al. | 74—230.17 |

DAVID J. WILLIAMOWSKY, *Primary Examiner.*

DON A. WAITE, *Examiner.*

L. H. GERIN, *Assistant Examiner.*